UNITED STATES PATENT OFFICE.

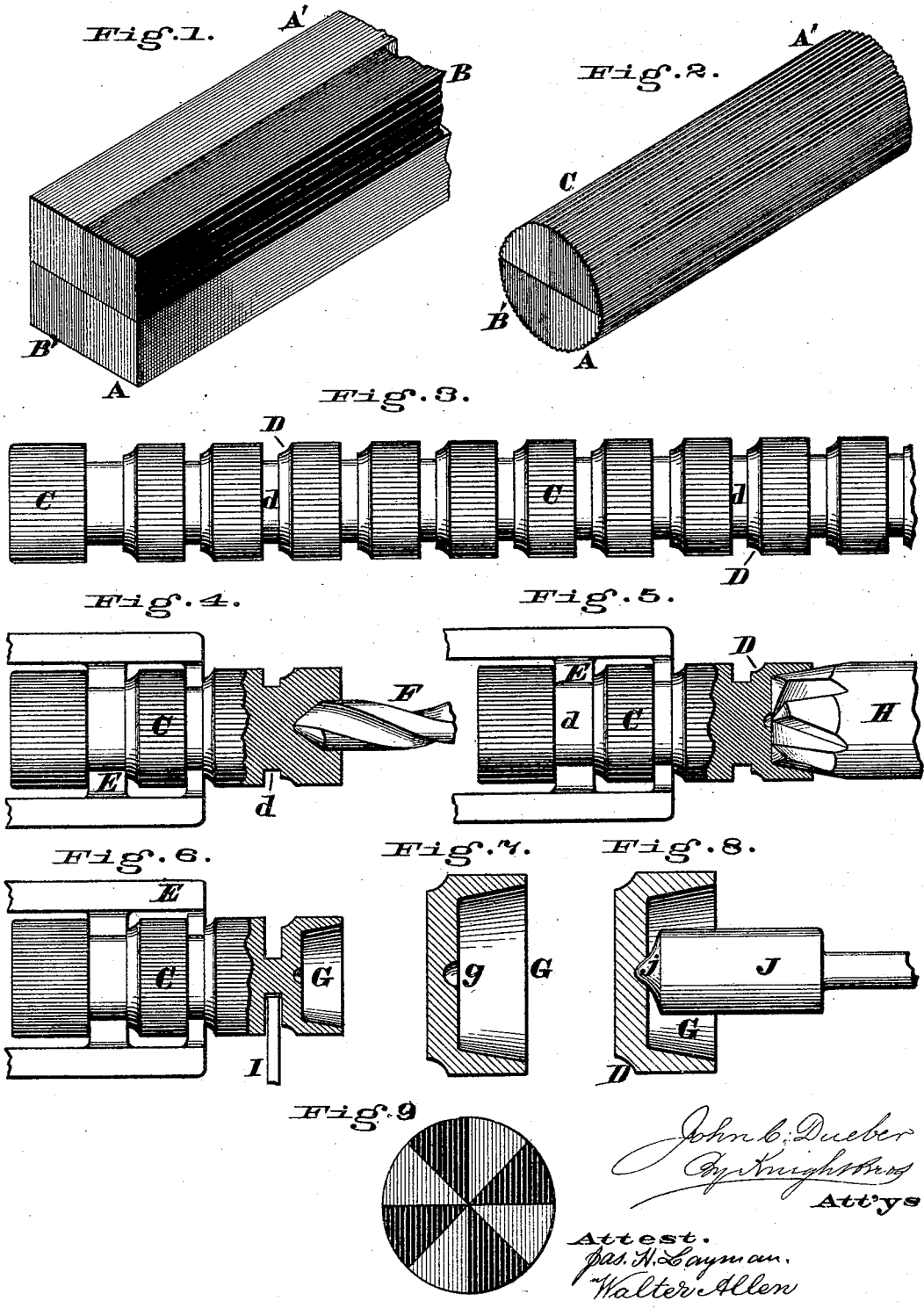

JOHN C. DUEBER, OF CINCINNATI, OHIO.

IMPROVEMENT IN THE MANUFACTURE OF PUSH-TOPS FOR WATCHES.

Specification forming part of Letters Patent No. 141,125, dated July 22, 1873; application filed March 1, 1873.

*To all whom it may concern:*

Be it known that I, JOHN C. DUEBER, of Cincinnati, Hamilton county, Ohio, have invented a new and useful Improvement in the Manufacture of Push-Tops and Pendants for Watches, of which the following is a specification:

My invention may be carried out by the use of a single homogeneous bar of metal for the manufacture of push-tops, but I prefer to use a composite bar or rod.

This composite metallic rod is formed in the following manner: I take, for example, two square bars of silver and two similar-shaped ones of gold, and solder them together in such a way as to form a single square rod of any suitable length and thickness. In forming this composite rod care should be taken to have the bars of similar metal diagonally opposite each other. My invention particularly consists in a novel mode or process for forming push-tops from either a single or a composite bar, which process I now proceed to describe.

The square rod is turned down to a cylindrical shape of any desired diameter and its periphery suitably "knurled," after which said rod has a number of circumferential grooves turned in it so as to leave knurled portions between these grooves equal to the length of the push-tops. After being grooved in this manner the interior of the bar is drilled out almost as deep as one of the grooves. This drilled portion is then severed from the bar, and the top is at once ready to have the push-piece soldered within it.

The above-described drilling and severing operation is continued until the entire bar is utilized.

Figure 1 is a perspective view of a composite rod consisting of the different-colored metals. Fig. 2 is a perspective view of the same rod after it has been reduced to a cylindrical form and its periphery ornamented with any approved form of knurls. Fig. 3 is an elevation of the rod with the circumferential grooves turned in it. Fig. 4 shows the rod grasped within a lathe-chuck and a recess being made in the exposed end of said rod with a twist-drill. Fig. 5 is a similar view, showing the action of the cutter which imparts the finish to the recess. Fig. 6 shows the recessed top in the act of being severed from the rod. Fig. 7 is an enlarged section of the severed push-top. Fig. 8 shows the method of applying the stem to the push-top. Fig. 9 represents a modification of the composite rod.

In its simplest and preferred form the composite rod consists of four bars, A A' and B B', which are soldered together so as to constitute a single square rod, as represented in Fig. 1. In this illustration the bars A A' are supposed to be made of silver and the ones B B' of gold, and they are arranged in such a manner as to bring metals of the same color diagonally opposite one another with reference to the composite rod. After being soldered securely together the composite rod is then centered in a lathe and brought to a cylindrical form, its periphery is knurled, as shown at C in Fig. 2, and said knurled rod has then turned in it a number of circumferential grooves, D $d$, as represented in Figs. 3, 4, 5, and 6, and it will be seen that the portions D of said grooves are comparatively shallow, while the portions $d$ are somewhat deeper. These grooves D $d$ are turned with any appropriate tool, and the spacing off of said grooves may be accomplished in any convenient manner. After being grooved one end of the rod is grasped by a lathe-clutch, E, and the exposed end of said rod is subjected to the action of a twist-drill, F, as seen in Fig. 4. The action of this disk serves to commence a recess, G, which is afterward finished by a suitable cutter, H, as shown in Fig. 5. Upon the completion of this recess a chisel, I, is applied to the rod so as to sever it at the deepest portion $d$ of the grooves, as seen in Fig. 6. This act completes the production of a single push-top similar to the one shown in Fig. 7, and the above-described series of operations are repeated until the entire rod has been utilized with the exception of the portion remaining within the chuck E. This portion of the rod, after being disengaged from the clutch, is melted down and formed into a new rod, so that no waste of metal occurs at any stage of the manufacture. The twist-drill F leaves a small pit or depression, $g$, in the recess G, which pit is adapted to receive and hold in proper central position for soldering the conical end $j$ of the push-stem J, that is soldered to the top, as shown in Fig. 8.

By this arrangement the art of centering the stem accurately within the push-top is accomplished instantly, and therefore the labor of producing this portion of the watch-case is greatly reduced. Instead of employing four bars for the purpose of forming the composite rod, a less number may be used, or a greater number, as shown in Fig. 9.

In this specification gold and silver have been alluded to as the component metals for forming the rod on account of the striking contrast of colors between them, but it is evident that the same result may be accomplished by the combination of other diversely-colored metals.

It will be readily seen that my method of manufacturing push-tops insures the utmost accuracy and uniformity of finish, and that such tops are much stiffer and more durable than those which are "spun up" in the old way.

Push-tops can be manufactured, as above described, from a single bar of metal instead of from the composite one, such as herein alluded to.

The contrast of color between the silver and gold adds greatly to the appearance of the watch.

As the knurling is imparted to the bar by a suitable cutter which travels along an engine-lathe, the utmost regularity and uniformity of finish is obtained, which cannot be accomplished when each push-top is knurled separately.

The portions $d$ of the grooves not only serve to indicate the exact places where the bar is to be severed, but they also allow the jaws of the clutch to grasp the rod without injuring the knurls.

I claim as my invention—

The method or process of manufacturing watch-case push-tops by knurling the entire periphery of a metallic bar or rod and subsequently turning, drilling, and cutting the same, all substantially as herein described.

In testimony of which invention I hereunto set my hand.

JOHN C. DUEBER.

Attest:
GEO. H. KNIGHT,
JAMES H. LAYMAN.